United States Patent
Hayashi et al.

(10) Patent No.: US 7,030,920 B1
(45) Date of Patent: Apr. 18, 2006

(54) IMAGE PICKUP APPARATUS USING A SELECTOR CIRCUIT

(75) Inventors: Hidetoshi Hayashi, Yamato (JP); Seiji Hashimoto, Yokohama (JP); Osamu Yuki, Atsugi (JP); Toshiaki Endo, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 836 days.

(21) Appl. No.: 09/630,526

(22) Filed: Aug. 1, 2000

(30) Foreign Application Priority Data

Aug. 4, 1999 (JP) .................................. 11-221736

(51) Int. Cl.
*H04N 3/14* (2006.01)
*H04N 5/335* (2006.01)

(52) U.S. Cl. ...................... 348/302; 348/294; 348/241; 348/304

(58) Field of Classification Search ........ 348/302–304, 348/311, 294, 245, 241, 243, 308
See application file for complete search history.

(56) References Cited

U.S. PATENT DOCUMENTS

| | | | | | |
|---|---|---|---|---|---|
| 5,450,129 | A | * | 9/1995 | Matoba et al. | 348/294 |
| 5,909,247 | A | * | 6/1999 | Hosokai et al. | 348/302 |
| 6,124,888 | A | * | 9/2000 | Terada et al. | 348/302 |
| 6,661,451 | B1 | * | 12/2003 | Kijima et al. | 348/294 |
| 2003/0067549 | A1 | * | 4/2003 | Ueno | 348/302 |

FOREIGN PATENT DOCUMENTS

| | | |
|---|---|---|
| JP | 55-92074 A | 7/1980 |
| JP | 5-122624 A | 5/1993 |
| JP | 06-338198 A | 12/1994 |
| JP | 06-350933 A | 12/1994 |
| JP | 7-46483 | 2/1995 |
| JP | 9-224196 A | 8/1997 |
| JP | 11-196332 A | 7/1999 |

* cited by examiner

*Primary Examiner*—David Ometz
*Assistant Examiner*—Gevell Selby
(74) *Attorney, Agent, or Firm*—Fitzpatrick, Cella, Harper & Scinto (57) ABSTRACT

A selector circuit having a shift register for sequentially outputting a select pulse and a decoder circuit for designating a desired block of a plurality of blocks divided from the scan circuit, so as to allow the scan circuit to start to output the select pulse from a head position in the designated desired block.

4 Claims, 13 Drawing Sheets

3×3 PIXELS PER ONE BLOCK

IMAGE PICKUP APPARATUS USING A SELECTOR CIRCUIT

BACKGROUND OF THE INVENTION

1. Field of the Invention

The present invention relates to a selector circuit for selecting a desired image area of and to an image pickup apparatus using the selector circuit.

2. Related Background Art

With a conventional image sensor having a plurality of solid image pickup elements disposed in a two-dimensional X-Y coordinate plane, each pixel can be directly accessed and a predetermined pixel area can be designated by using horizontal and vertical shift registers for designating X- and Y-addresses and decoder circuits for controlling the horizontal and vertical shift registers.

The number of pixels of a recent image pickup apparatus using solid state image pickup elements is increasing year after year, and for this reason, the number of bits of a decoder increases and the circuit structure becomes complicated. For example, a solid state image pickup device having 2000 pixels in the horizontal line requires a decoder circuit of 11 bits or $2^{11}=2024$ in order to select each of 2000 pixels.

If all pixels are to be randomly accessed without using a decoder circuit, a pixel area not to be accessed is skipped at high speed, according to conventional techniques. This method is, however, associated with a problem of a large power consumption to be caused by a high speed operation. In order to solve this problem, a shift register of a memory type has been proposed.

Figure 1:
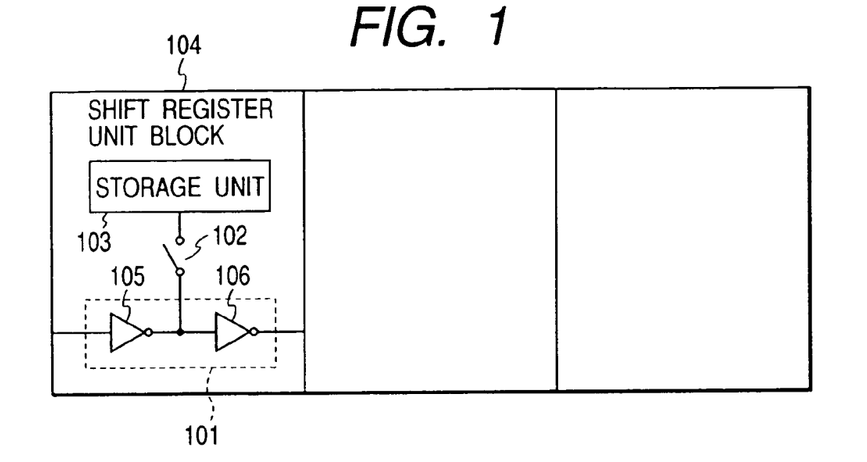
FIG. 1 is a block diagram showing a scanning shift register of a conventional image pickup apparatus.

Such the shift register is disclosed, for example, in Japanese Patent Application Laid-Open No. 6-350933, in which each shift register unit is provided with a potential storage unit so that pixels in a desired pixel area can be read. FIG. 1 is a diagram showing the outline of that shift register. In FIG. 1, a shift register unit block 104 is constituted of a shift register unit 101, a storage unit 103 and a switch 102. The shift register unit 101 is constituted of two serially connected inverters 105 and 106. The storage unit 103 stores information of the shift register unit 101. The switch 102 transfers the information stored in the storage unit 103 to the shift register unit 101. A plurality of unit blocks 104 are connected in cascade to constitute the shift register. Image data of each unit block stored in the storage unit 103 is sequentially read on a unit block basis to read necessary image data. However, this requires a two-step process including a process for setting a read-out start position and a process for reading out a desired area.

SUMMARY OF THE INVENTION

It is an object of the invention to provide an apparatus capable of scanning substantially only a predetermined area.

In order to achieve the above object, according to an aspect of the present invention, there is provided a selector circuit comprising: a scan circuit for sequentially outputting a pulse for selection; and a decoder circuit for designating a desired block of the scan circuit divided into a plurality of blocks, so as to allow the scan circuit to start to output the pulse from a predetermined position in the designated desired block.

Another aspect of the present invention provides a selector circuit comprising: scanning means for sequentially outputting a pulse for selection; first designating means for supplying a start signal for a desired block of a predetermined area divided into a plurality of blocks smaller than a whole area of the scanning means, so as to allow the scanning means to start to output the pulse from a predetermined position in the desired block; and second designating means for supplying a start signal to start to output sequentially the pulse from an area other than the predetermined area of the scanning means.

Another aspect of the invention provides an image pickup apparatus comprising: a plurality of pixels; a scan circuit for sequentially outputting a pulse for selection; and a decoder circuit for designating a desired block of the scan circuit divided into a plurality of blocks, so as to allow the scan circuit to start to output the pulse from a predetermined position in the designated desired block.

Another aspect of the invention provides an image pickup apparatus comprising: a plurality of pixels for obtaining image signals; a plurality of optical black pixels for obtaining a dark level; scanning means for sequentially outputting a select pulse for selecting the plurality of pixels and the plurality of optical black pixels; a first designating circuit for supplying a start signal for a desired block of the scanning means divided into a plurality of blocks to select the plurality of pixels, so as to allow the scanning means to start to output the select pulse from a predetermined position in the desired block; and second designating means for supplying a start signal for sequentially outputting the select pulse to select the plurality of optical black pixels.

Another aspect of the invention provides an image pickup system comprising: a plurality of pixels; a scan circuit for sequentially outputting a select pulse for selecting each pixel; a decoder circuit for designating a desired block of the scan circuit divided into a plurality of blocks, so as to allow the scan circuit to start to output the select pulse from a predetermined position in the designated desired block; an analog/digital converter circuit for converting a signal from each of the plurality of pixels into a digital signal; and a signal processing circuit for processing a signal output from the analog/digital converter circuit.

Other objects and features of the invention will become more apparent from the following detailed description of embodiments when read in conjunction with the accompanying drawings.

DETAILED DESCRIPTION OF THE PREFERRED EMBODIMENTS

Embodiments of the invention will be described in detail with reference to the accompanying drawings.

Figure 2:
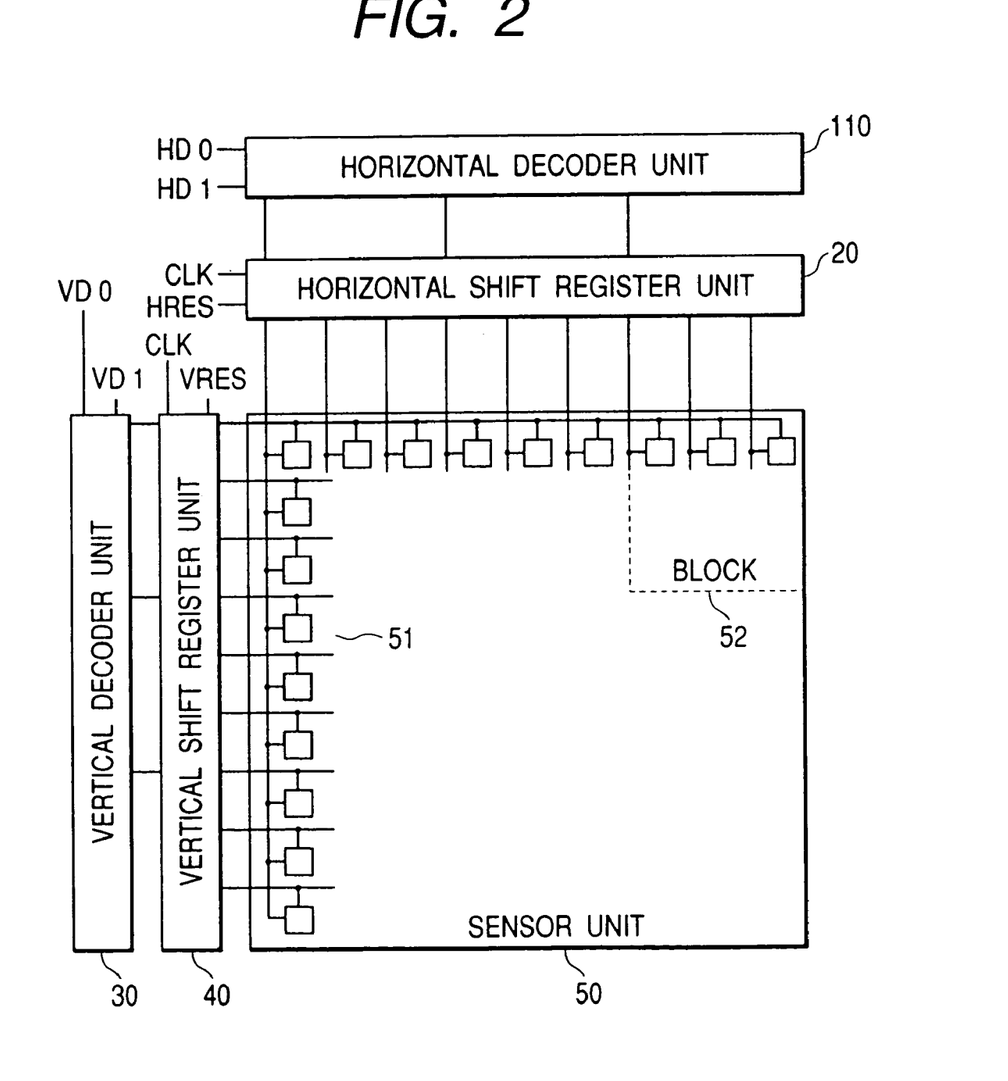
FIG. 2 shows an example of the configuration of decoder units and shift register units of an image pickup apparatus according to an embodiment of the present invention.

FIG. 2 shows an example of the configuration of a solid state image pickup apparatus having decoder units and shift register units according to a first embodiment of the invention.

Referring to FIG. 2, a sensor unit 50 has 9×9 pixels. A horizontal shift register unit 20 and a vertical shift register unit 40 are provided to designate each of nine pixels arranged in X- and Y-directions. A horizontal decoder unit 110 and a vertical decoder unit 30 are connected to the horizontal shift register unit 20 and vertical shift resister unit 40, respectively, in order to make the shift register units 20 and 40 designate a desired pixel area. The pixels 51 are divided into blocks 52 each having, for example, 3×3 pixels.

HD0 and HD1 are input to the horizontal decoder unit 110, and a clock pulse (CLK) and a horizontal reset pulse (HRES) are input to the horizontal shift register unit 20. Similarly, VD0 and VD1 are input the vertical decoder unit 30, and a clock pulse (CLK) and a vertical reset pulse (VRES) are input to the vertical shift register unit 40. The structures of the horizontal and vertical units are almost similar so that the following description is directed only to the horizontal units.

Two bits of HD0 and HD1 input to the horizontal decoder unit 110 cannot designate all nine pixels in the horizontal direction. However, two bits can designate three pixels. In this context, the nine pixels in the horizontal direction is divided into three blocks each having three pixels, as shown in FIG. 1. The decoder unit 110 can designate one of three head pixels in three blocks.

The horizontal shift register unit 20 is connected between the horizontal decoder unit 110 and sensor unit 50. Upon reception of the head position of each block 52 from the horizontal decoder unit 110, the horizontal shift register unit 20 sequentially scans each pixel in the sensor unit 50 starting from the head position, in response to the clock pulse CLK. If the scan is to be stopped, the horizontal reset pulse HRES is input to erase the contents in the horizontal shift register unit 20.

Figure 3:
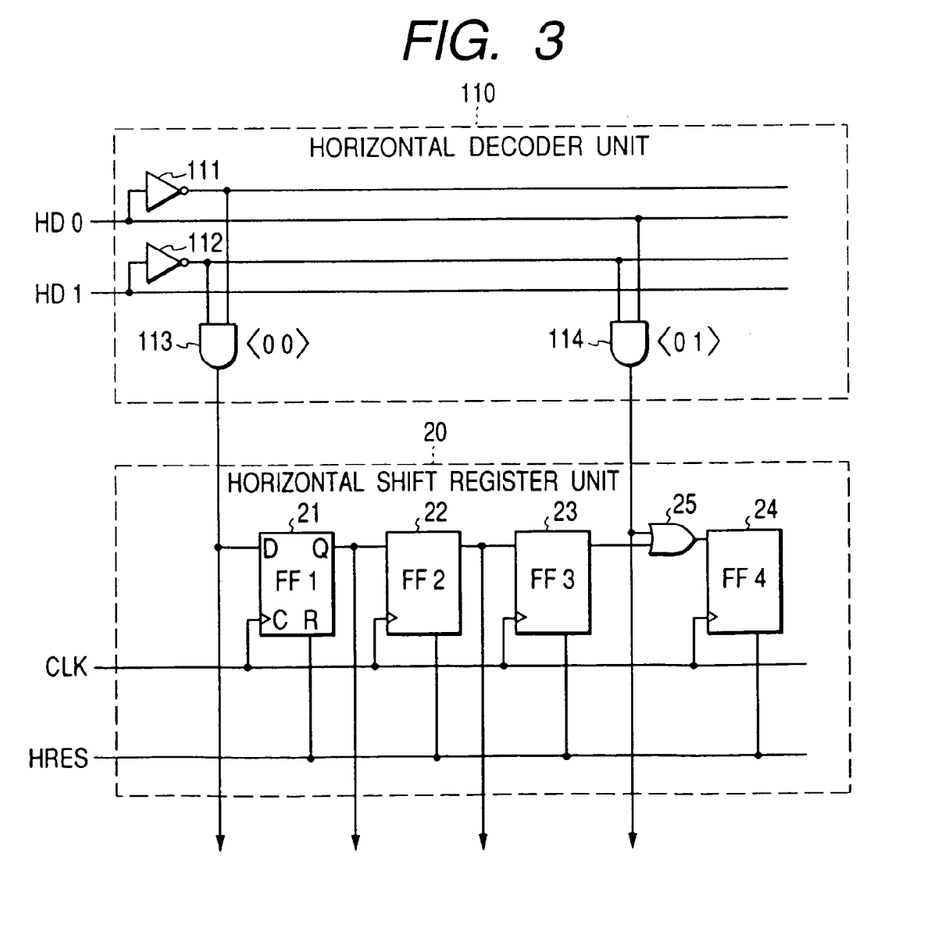
FIG. 3 is a circuit diagram of a horizontal decoder unit and a horizontal shift register unit of the image pickup apparatus.

FIG. 3 is a circuit diagram showing an example of the structure of the horizontal decoder unit 110 and horizontal shift register unit 20 shown in FIG. 2.

The horizontal decoder unit 110 where input is HD0 as its lower digit and HD1 as its upper digit is constituted of AND gates 113 and 114 and inverters 111 and 112. The horizontal shift register unit 20 is constituted of four D-type flip-flops 21 to 24. The horizontal decode unit 110 may be circuit components other than AND gates and inverters, and the horizontal shift register unit 20 may be clocked inverters as in a conventional case.

If <0, 0> is input as <HD0, HD1> to the horizontal decoder unit 110, the leftmost pixel is selected at the same time when the flip-flop (FF1) 21 is selected. Thereafter, the flip-flop (FF2) 22 and flip-flop (FF3) 23 are sequentially selected in response to clock pulses CLK. Transition from the flip-flop (FF3) 23 to flip-flop (FF4) 24 is effected by an OR gate 25 to which an output of the AND gate 114 for <0, 1> is input. All nine pixels in the block can be scanned in this manner unless a reset pulse is input before the ninth pixel is scanned.

Figure 4:
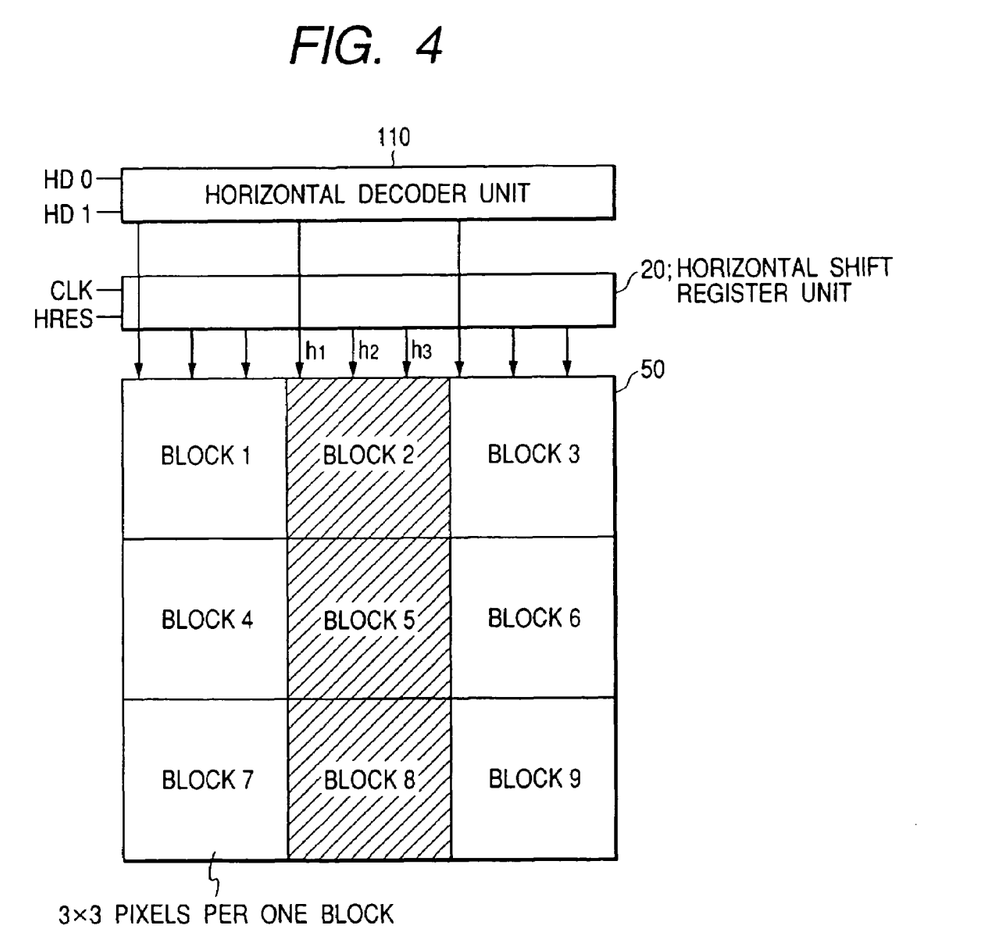
FIG. 4 shows an example of the configuration of the horizontal decoder unit and horizontal shift register unit of the image pickup apparatus.
Figure 5:
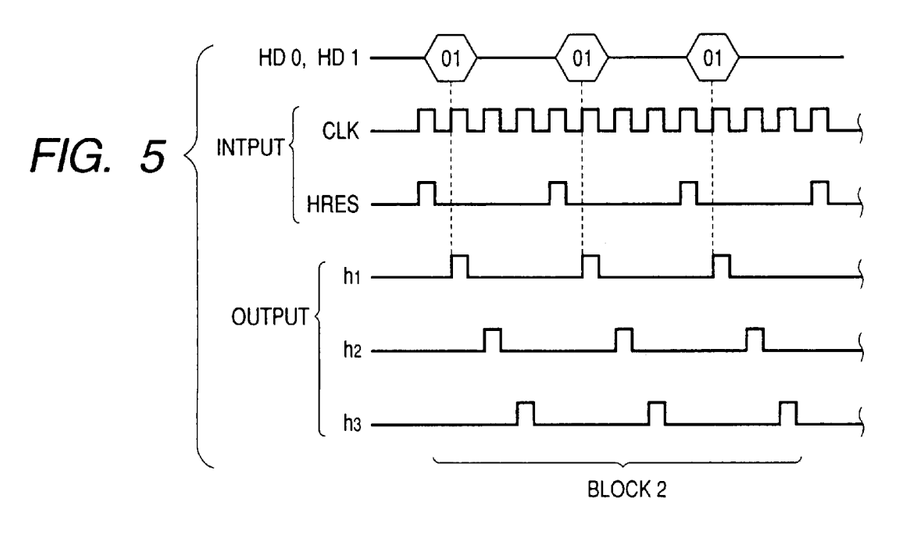
FIG. 5 is a timing chart illustrating the operation of the horizontal decoder unit and horizontal shift register unit for reading a desired image area of the image pickup apparatus.

FIG. 4 shows an example of the configuration of the horizontal decoder unit 110 and horizontal shift register unit 20 shown in FIG. 3 which scans a desired pixel area, and FIG. 5 is the timing chart illustrating this operation.

As shown in FIG. 4, 9×9 pixels are divided into nine blocks each having 3×3 pixels. In this example, the horizontal decoder unit 110 and horizontal shift register unit 20 scan only the blocks 2, 5 and 8. As shown in the timing chart of FIG. 5, <0, 1> is input as <HD0, HD1> in order to designate the head pixel of each of these blocks. Therefore, the flip-flop (FF4) can be designated directly by skipping the flip-flops (FF1 to FF3). After the horizontal reset pulse HRES is input, pixels are sequentially designated according to the input of the horizontal shift register unit 20 in response to clock pulses CLK.

Immediately after a horizontal selection output line $h_3$ shown in FIG. 4 is selected, the flip-flops are reset with the horizontal reset pulse HRES. In this manner, only the block 2 can be scanned. This operation is repeated in a similar manner three times to scan the blocks 2, 5 and 8. Only one pulse of contents of an input of the horizontal decoder unit is output by using a latch circuit or the like.

The vertical decoder unit 30 and vertical shift register unit 40 operate in a similar manner to the horizontal decoder unit 110 and horizontal shift register unit 20 described above, which select blocks in the horizontal direction, to select each pixel in the pixel read area in the vertical direction and provide the advantageous effects described above.

Next, a second embodiment of an image pickup apparatus will be described which can scan a desired pixel area starting from a desired pixel and ending in a desired pixel.

Figure 6:
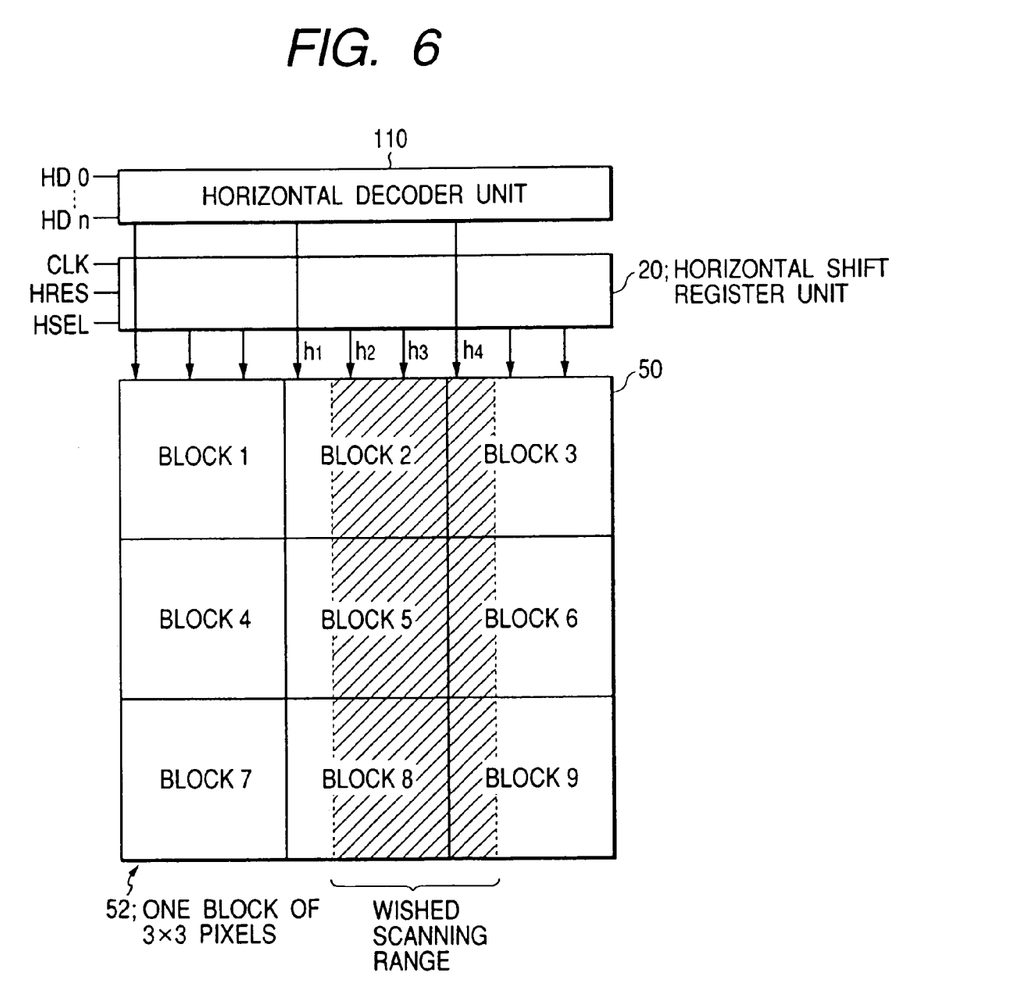
FIG. 6 shows an example of the configuration of a horizontal decoder unit and a shift register unit for reading a desired image area of the image pickup apparatus.
Figure 7:
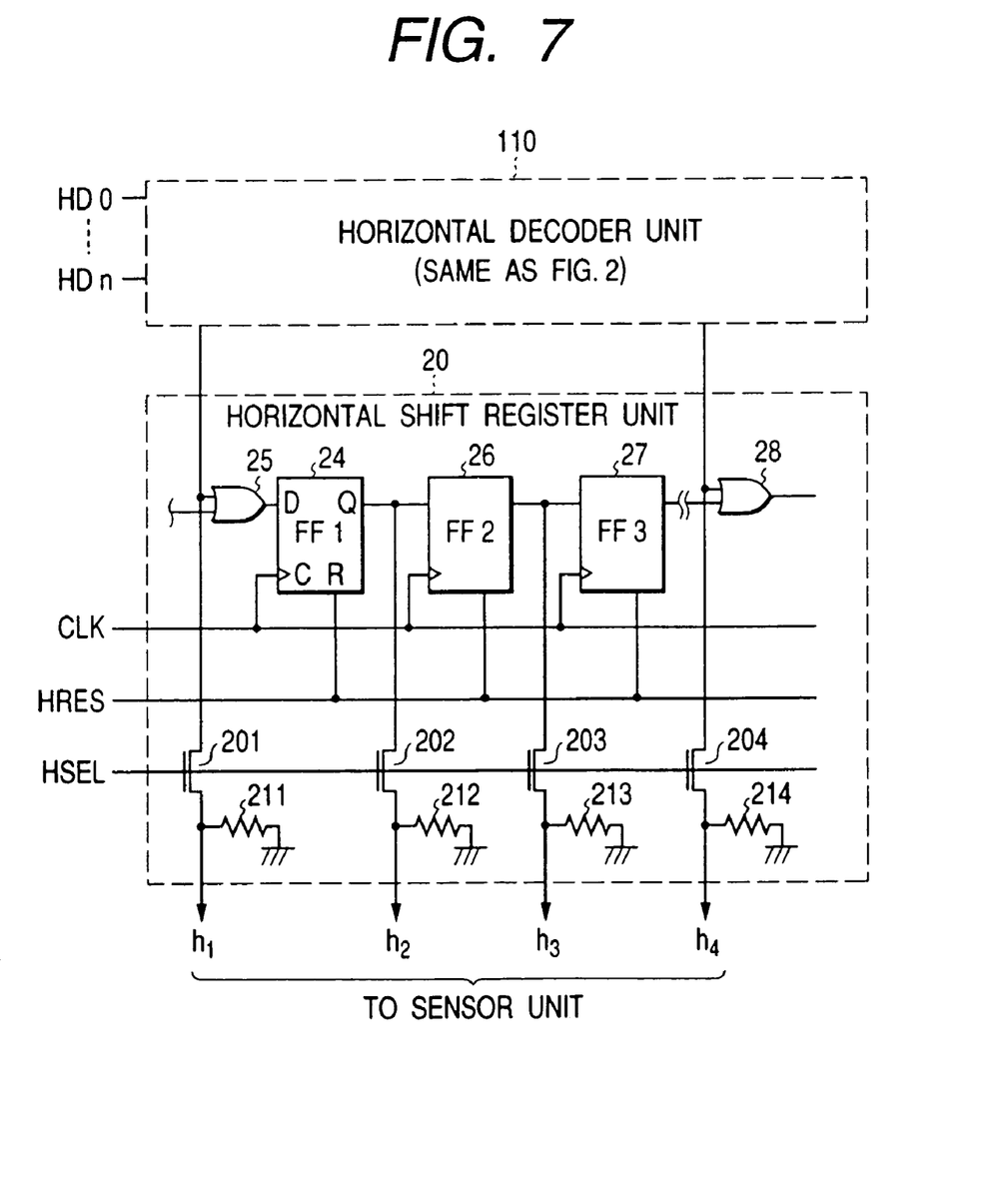
FIG. 7 is a circuit diagram of the shift register unit of the image pickup apparatus.

FIG. 6 shows an example of the configuration of a horizontal decoder unit 110 and a horizontal shift register unit 20 capable of scanning a block starting from a desired pixel position. FIG. 7 is a circuit diagram of the horizontal shift register unit 20. This circuit is fundamentally same as that shown in FIG. 3, excepting that the shift register unit 20 has additional horizontal pixel select switches 201 to 204 of MOS transistors and resistors 211 to 214 terminating the switches. A horizontal select pulse HSEL turns on and off all the switches at the same time. The operation of the horizontal decoder unit 110 and horizontal shift register unit 20 is illustrated in the timing chart of FIG. 8.

In this example, scanning starts from a horizontal selection output line $h_2$. As shown in FIG. 6, <0, 1> is first input to the horizontal decoder unit 110. Since the horizontal select pulse HSEL is set to a low level, the horizontal selection output line $h_1$ is not selected.

Upon reception of the next clock CLK, a horizontal selection output line $h_2$ is selected and the horizontal selection pulse HSEL is set to a high level to allow output of the horizontal output line. After a horizontal selection output line $h_4$ is selected, the horizontal selection pulse HSEL is set to the low level to reset flip-flops 24 to 27. In this manner, scanning starting from a desired pixel position in a selected block can be achieved.

Figure 9A:
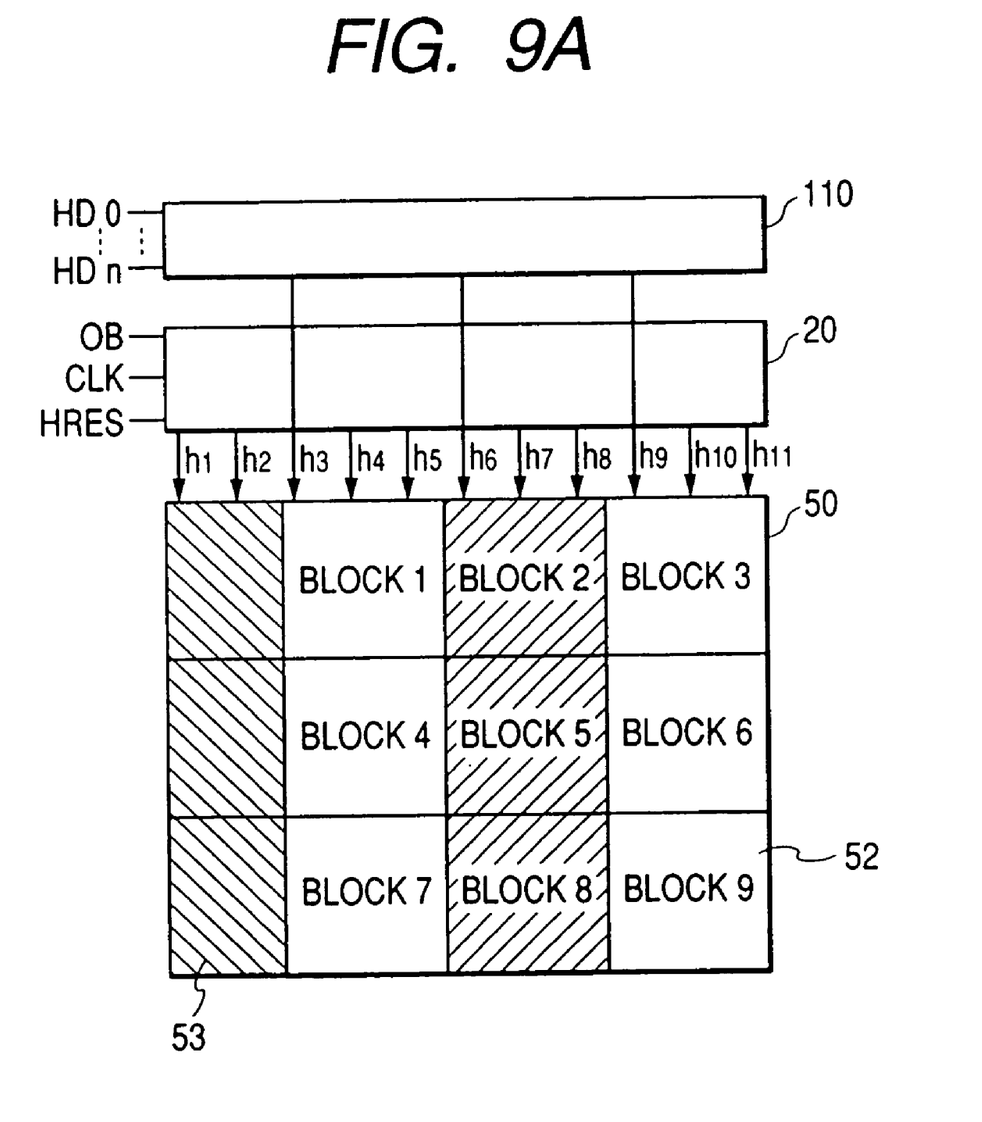
FIG. 9A shows an example of the configuration of a horizontal decoder unit and a horizontal shift register unit of an image pickup apparatus.
Figure 9B:
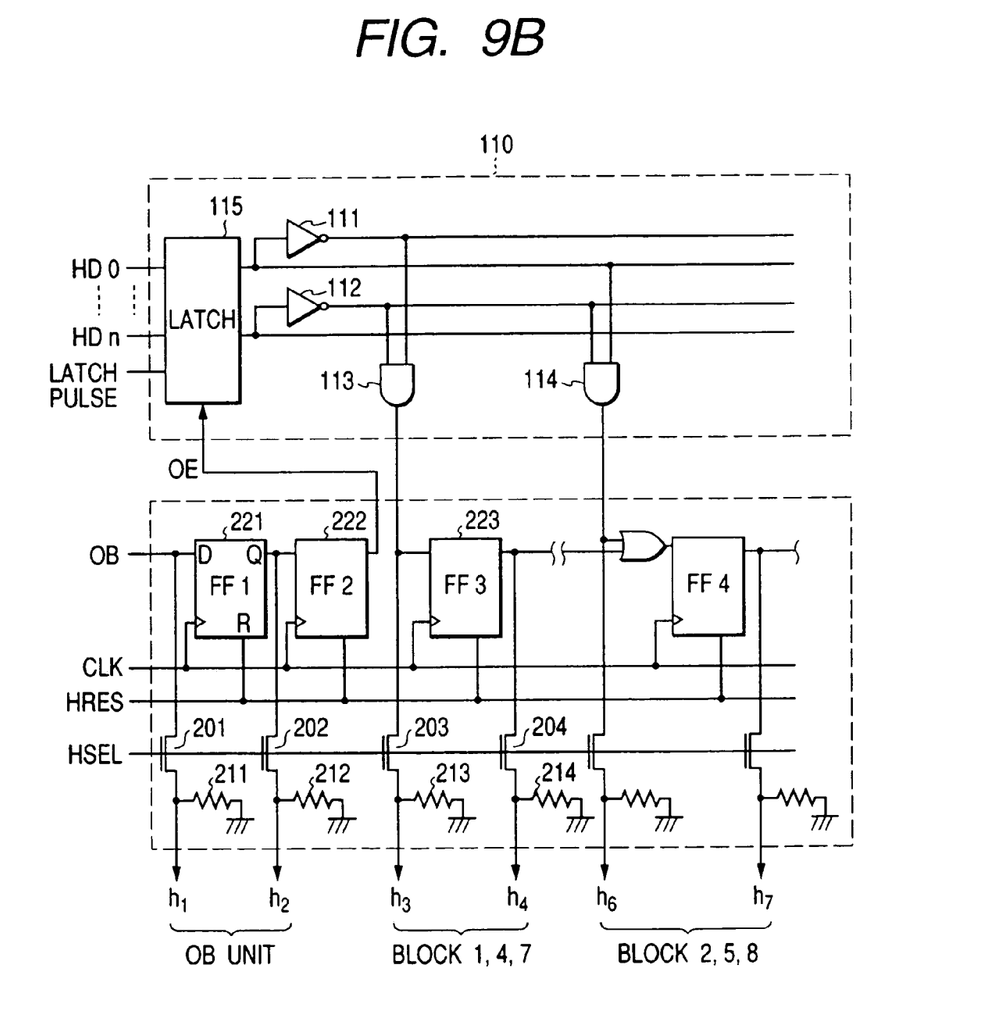
FIG. 9B is a circuit diagram of the horizontal decoder unit and horizontal shift register unit.

Next, a third embodiment of an image pickup apparatus will be described with reference to FIGS. 9A and 9B. This image pickup apparatus has, in addition to a sensor unit such as shown in FIG. 6 having pixels for generating image signals, an optical black (OB) unit having a plurality of optical black pixels used for detecting a dark level. FIG. 9A shows an example of the configuration of this embodiment. It is assumed herein for the purpose of simplicity that a sensor unit 50 has 9×9 pixels and an OB unit 53 has 2×9 pixels corresponding to horizontal selection output lines $h_1$ and $h_2$ of the horizontal shift register unit 20.

The OB unit 53 is required to be scanned every 1 H. In this example, only blocks 2, 5 and 8 corresponding to horizontal selection output lines $h_6$ to $h_8$ are selectively scanned. FIG. 9B is a circuit diagram of a horizontal decoder unit 110 and a horizontal shift register unit 20 for selective scanning of blocks. This circuit is featured in that an OB terminal and D-type flip-flops 221 and 222 are added to the horizontal shift register unit 20 in order to scan the two vertical pixel columns of the OB unit 53. After the OB unit is scanned and after a lapse of one clock, a timing representative of a scan completion of the OB unit is supplied to an output enable OE terminal of a latch circuit 115 of the horizontal decoder unit 110, to thereby allow a scan of a desired pixel area. In addition to the D-type flip-flops 221 and 222, the horizontal shift register unit 20 is provided for the OB unit 53 with horizontal pixel select switches 201 to 204 of MOS transistors operating in response to a horizontal select pulse HSEL and resistors 211 to 214 terminating the switches.

Figure 10:
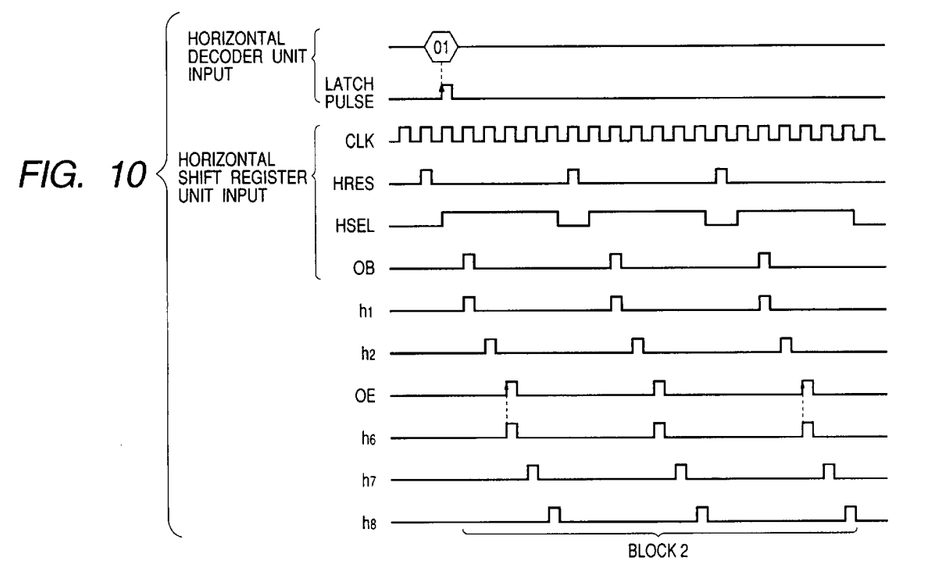
FIG. 10 is a timing chart illustrating the operation of the horizontal decoder unit and horizontal shift register unit of the image pickup device together with an optical black OB unit.

The operation of the image pickup apparatus having the OB unit shown in FIGS. 9A and 9B will be described with reference to the timing chart shown in FIG. 10.

When <0, 1> data is input to the horizontal decoder unit 110, this data is changed to data having one clock length by a latch pulse input to a latch circuit 115 and held in the latch circuit 115. When a next clock pulse is input to the OB unit, a horizontal selection output line $h_1$ is selected to thereafter scan pixels of the OB unit. After the OB unit is scanned and after a lapse of one clock, a timing representative of a scan completion of the OB unit is supplied to the output enable OE terminal of the latch circuit 115, to thereafter start scanning the sensor unit starting from the horizontal selection output line $h_6$. After the horizontal selection output line $h_8$ is selected and pixels are scanned, the horizontal select pulse HSEL is set to a low level and then the flip-flops are reset.

A specific pixel area such as shown in FIG. 6 may be scanned by using the horizontal select pulse HSEL.

Next, a fourth embodiment of an image pickup apparatus will be described.

Figure 11A:
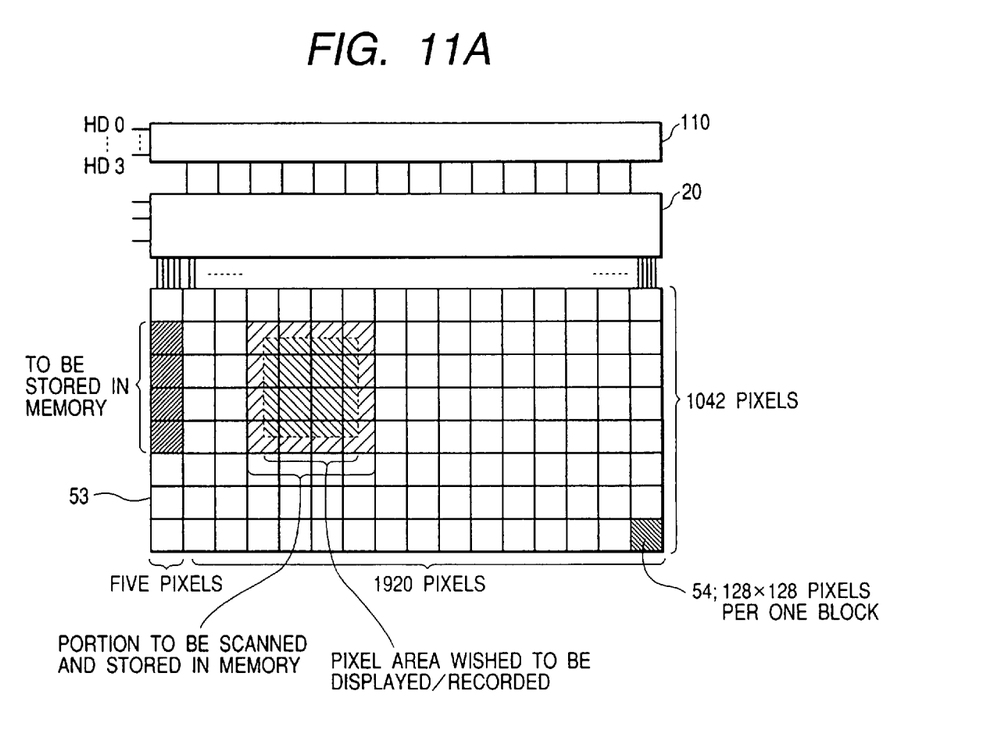
FIG. 11A shows an example of the configuration of a horizontal decoder unit and a horizontal shift register unit of an image pickup apparatus.

As shown in FIG. 11A, the image pickup apparatus of this embodiment has: a sensor unit having 1920×1024 pixels divided into horizontal 15 blocks and vertical 8 blocks each block having 128×128 pixels; and an OB unit 53 having five pixels per 1H.

Figure 11B:
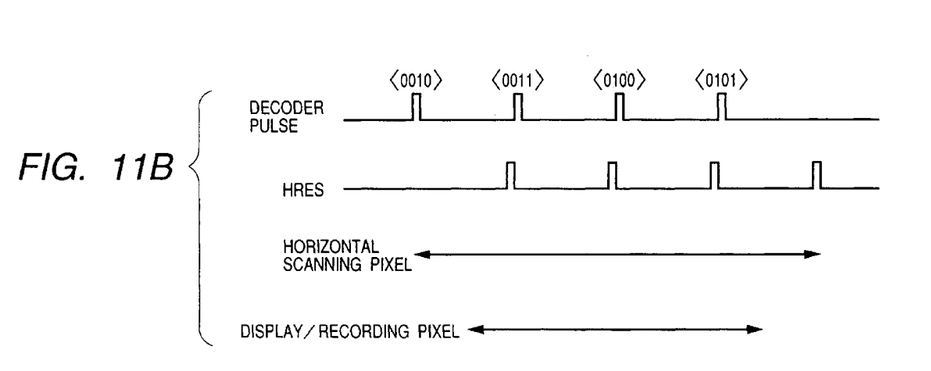
FIG. 11B is a timing chart illustrating the operation of the horizontal decoder unit and horizontal shift register unit.
Figure 12:
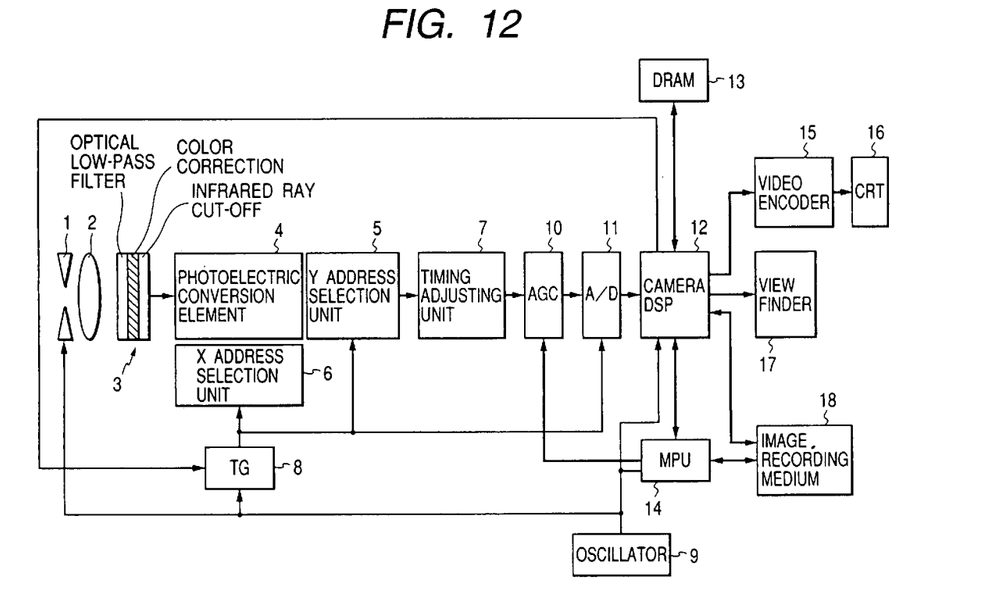
FIG. 12 shows an example of the structure of an image pickup system.

In this example, scanning starting from a desired pixel in a block and ending in a desired pixel in a block are used. All relevant blocks corresponding to the start pixel and the end pixel of scanning are first scanned and stored in a DRAM memory 13 such as shown in FIG. 12. Pixels which are not used are not read from the memory 13. The circuit structure is fundamentally same as that shown in FIG. 9. However, since delay of timings of scanning pixels starting from a desired pixel in a block and ending in a desired pixel in a block, as illustrated in FIG. 10, are not necessary, the horizontal select pulse HSEL is not required. Operation timings of this embodiment are similar to the flow chart of FIG. 10. FIG. 11B is a flow chart illustrating the operation of this embodiment, without the horizontal select pulse HSEL. A horizontal decoder unit 110 is sequentially input with data <0010> to <0101> to select horizontal blocks and scan them. Pixel data of these blocks is stored in the DRAM memory and necessary pixel data is selected and processed by a camera DSP 12 such as shown in FIG. 12.

FIG. 12 is a block diagram showing the whole structure of an image pickup system using the image pickup apparatus of one of the first to fourth embodiments described above. Photoelectric conversion elements 4, X and Y address selection units 5 and 6 shown in FIG. 12 are realized by using one of the first to fourth embodiments.

Referring to FIG. 12, light from an object passes through diaphragm 1 and focussed by a lens 2 onto the photoelectric conversion elements 4 which convert an object image into electrical signals. Reference numeral 3 represents a filter group made of a combination of an optical low-pass filter for cutting high frequency components of light in order to eliminate moire or the like, a color correction filer having the optical characteristics matching the photoelectric conversion elements 4, an infrared ray cut-off filter for cutting light outside the visual sense range, and the like.

Two-dimensional pixel positions of photoelectric signals converted by the photoelectric conversion elements 4 are designated by the X- and Y-address selection units 6 and 5 operating in response to clock signals from a timing generator TG 8, to read the photoelectric signals to a timing adjusting unit 7. The timing adjusting unit 7 adjusts the timings of an output (one to a plurality of outputs) from the photoelectric conversion elements 4. A voltage of each adjusted photoelectric signal is controlled by an AGC circuit 10 and the output of the AGC circuit is converted into a digital signal by an A/D converter 11.

A camera digital signal processor DSP 12 processes a moving image or a still image. A MPU 14 sets image processing parameters to the camera DSP 12, and executes an automatic exposure AE process and an auto focussing AF process. An oscillator 9 supplies various clocks to the diaphragm 1, timing generator TG 8, camera DSP 12 and MPU 14 to synchronize the whole components of the system.

A DRAM memory 13 is used for a temporary storage area while an image is processed. An image recording medium 18 is used as a non-volatile storage area such as a smart medium, a magnetic tape and an optical disk.

A video encoder 15, a CRT 16 and the like are provided for display of a processed image. A viewfinder 17 such as an LCD is used for confirming an object image before it is stored in the image recording medium 18. Instead of CRT 16, a liquid crystal display, a plasma display, a display panel using electron emitting elements or the like may also be used. Output devices are not limited to CRT 16, viewfinder 17 and image recording medium 18 and may be a printer using a print sheet, a plain sheet or the like.

The photoelectric conversion elements 4 and other components such as camera DSP 12 and MPU 14 may be formed on different semiconductor chips or on the same semiconductor chip by using CMOS processes or the like. A compact system LSI commercially available may also be used.

As described so far, in the first to fourth embodiments described above, the shift resister unit can scan pixels starting from a desired pixel and ending in a desired pixel.

Accordingly, a desired pixel area of an object image can be designated with a simple circuit operation, and the designated desired pixel area can be enlarged and displayed on a display. Since it is not necessary to use a decoder having the number of bits covering all pixels, the number of bits of a decoder can be reduced. In the above embodiments, although the decoder circuit constituted of a shift register unit and a decoder unit is applied to an image pickup apparatus, it may be applied to other devices such as a memory.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus comprising:
   a sensor portion including a plurality of pixels;
   an optical black portion including a plurality of optical black pixels;
   a scanning circuit effecting scanning for reading out signals of said sensor portion and said optical black portion; and
   a decoder for dividing said scanning circuit into a plurality of blocks and controlling said scanning circuit to cause scanning to start at a desired one of the plurality of blocks,
   wherein said decoder includes a latch circuit to which a start signal is input corresponding to the block at which said scanning circuit starts to scan, and
   wherein said scanning circuit is arranged to start the scanning for said optical black portion and is also arranged to input said start signal to said latch circuit to instruct said decoder to start the control of said scanning circuit to scan said sensor portion.

2. An apparatus according to claim 1, wherein upon receiving a reset pulse, said scanning circuit stops scanning.

3. An apparatus according to claim 2, further comprising:
   a lens for focusing light onto said sensor portion;
   an A/D converter for converting the signals from said sensor portion into digital signals; and
   a digital signal processor for processing a signal from said A/D converter.

4. An apparatus according to claim 1, further comprising:
   a lens for focusing light onto said sensor portion;
   an A/D converter for converting the signals from said sensor portion into digital signals; and
   a digital signal processor for processing a signal from said A/D converter.

* * * * *

UNITED STATES PATENT AND TRADEMARK OFFICE
CERTIFICATE OF CORRECTION

| | |
|---|---|
| PATENT NO. | : 7,030,920 B1 |
| APPLICATION NO. | : 09/630526 |
| DATED | : April 18, 2006 |
| INVENTOR(S) | : Hidetoshi Hayashi et al. |

It is certified that error appears in the above-identified patent and that said Letters Patent is hereby corrected as shown below:

SHEET 7

Figure 8:
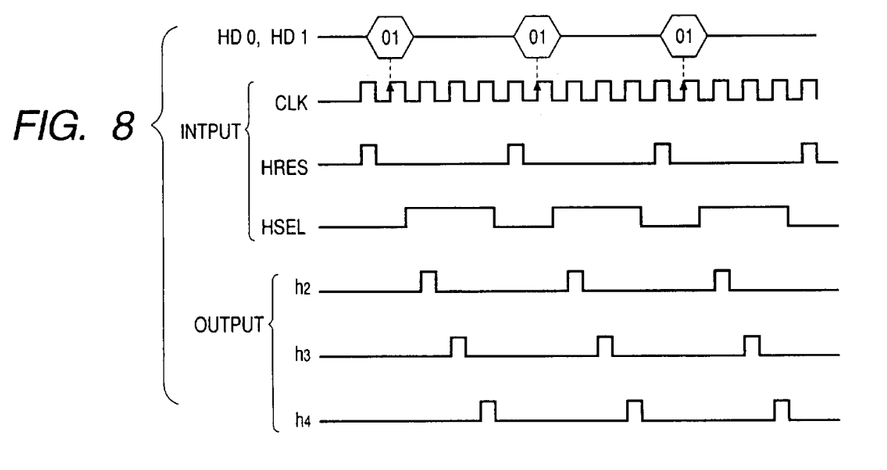
FIG. 8 is a timing chart illustrating the operation of the horizontal decoder unit and horizontal shift register unit of the image pickup apparatus.

FIG. 8 "INTPUT" should read --INPUT--.

COLUMN 3

Line 47, "is" should read --are--.

COLUMN 4

Line 51, "excepting" should read --except--.

COLUMN 6

Line 19, "focussed" should read --is focussed--; and
    Line 24, "filer" should read --filter--.

Signed and Sealed this

Seventeenth Day of October, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,030,920 B1 | Page 1 of 1 |
| APPLICATION NO. | : 09/630526 | |
| DATED | : April 18, 2006 | |
| INVENTOR(S) | : Hidetoshi Hayashi et al. | |

It is certified that error appears in the above-identified patent and that said Letters Patent is hereby corrected as shown below:

SHEET 7

FIG. 8 "INTPUT" should read --INPUT--.

COLUMN 3

Line 47, "is" should read --are--.

COLUMN 4

Line 51, "excepting" should read --except--.

COLUMN 6

Line 19, "focussed" should read --is focussed--; and
    Line 24, "filer" should read --filter--.

This certificate supersedes Certificate of Correction issued October 17, 2006.

Signed and Sealed this

Twenty-first Day of November, 2006

JON W. DUDAS
*Director of the United States Patent and Trademark Office*